(12) United States Patent
Yamamoto (10) Patent No.: US 6,514,171 B2
(45) Date of Patent: Feb. 4, 2003

(54) TOROIDAL CONTINUOUSLY VARIABLE TRANSMISSION

(75) Inventor: Takeshi Yamamoto, Kanagawa (JP)

(73) Assignee: Nissan Motor Co., Ltd., Tokohama (JP)

( * ) Notice: Subject to any disclaimer, the term of this patent is extended or adjusted under 35 U.S.C. 154(b) by 0 days.

(21) Appl. No.: 09/839,143

(22) Filed: Apr. 23, 2001

(65) Prior Publication Data

US 2001/0041643 A1 Nov. 15, 2001

(30) Foreign Application Priority Data

May 12, 2000 (JP) .................................. 2000-139569

(51) Int. Cl.⁷ .............................................. F16H 15/38
(52) U.S. Cl. ......................................... 476/40; 476/46
(58) Field of Search .............................. 476/40, 42, 46; 384/455, 571

(56) References Cited

U.S. PATENT DOCUMENTS

| 1,947,044 A | * | 2/1934 | Gove | ......................... 475/192 |
| 2,594,578 A | * | 4/1952 | McNicoll | ............... 29/898.063 |
| 3,760,646 A | * | 9/1973 | Kraus | .......................... 476/10 |
| 5,984,827 A | | 11/1999 | Yamamoto | ................... 476/70 |

FOREIGN PATENT DOCUMENTS

| JP | 9-4688 | | 1/1997 |
| JP | 9-324841 | * | 12/1997 |
| JP | 10-169741 | * | 6/1998 |

* cited by examiner

Primary Examiner—William C Joyce
(74) Attorney, Agent, or Firm—Foley & Lardner (57) ABSTRACT

A toroidal continuously variable transmission including an input shaft rotatably disposed within a casing, an input disk connected with the input shaft, an output disk cooperating with the input disk to form a toroidal cavity between opposed surfaces thereof, a power roller rotatably disposed in the toroidal cavity, and an output shaft receiving the torque via the power roller and the output disk. Input and output shafts are rotatably supported by input and output bearings. Each of the input and output bearings includes a taper-roller bearing and a radial bearing arranged parallel to the taper-roller bearing. The taper-roller bearing has an outer race contact angle of not less than 45 degrees between the rotation axis and the mutual contact of an outer race and tapered rollers.

21 Claims, 7 Drawing Sheets

TOROIDAL CONTINUOUSLY VARIABLE TRANSMISSION

FIELD OF THE INVENTION

This invention relates to a toroidal continuously variable transmission (CVT) for vehicles.

BACKGROUND OF THE INVENTION

Continuously variable transmissions (CVTs) for vehicles have recently been developed because of the smooth motion, easy operation, and improved fuel economy. Among the CVTs, there is well known a toroidal traction drive CVT (referred to hereinafter as a toroidal CVT) adapted for transmitting power using shear of an oil film. In general, the toroidal CVT includes an input disk on an input shaft, an output disk on an output shaft coaxial with the input shaft, and a plurality of power rollers disposed between the input and output disks in contact therewith.

The toroidal CVTs are classified depending on shape thereof into a full toroidal and a half toroidal. In the full toroidal CVT, there occurs a thrust or axial force applied to the power rollers. On the other hand, the half toroidal CVT suffers from application of a thrust to the power rollers, necessitating bearing for carrying the thrust. The characteristic of the bearing significantly affects operating efficiency of the half toroidal CVT. However, in the half toroidal CVT, intersection of two tangent lines extending from two contact points between the input and output disks and the power roller forms a locus that is located near a rotation axis of the power roller. This causes a reduced spin loss in the half toroidal CVT as compared with a spin loss in the full toroidal CVT. The half toroidal CVT has been selectively used by taking account of the balance between the features of the full toroidal CVT and the half toroidal CVT. The speed change operation by the half toroidal CVT is conducted by slightly displacing a power roller support member (referred to hereinafter as a trunnion) in a direction perpendicular to the rotation axis of the power roller and the common rotation axis of the input and output disks. The displacement causes a side-slip force to thereby generate a slant rolling force.

Japanese Patent Application First Publication No. 9-004688 discloses a toroidal CVT including an input shaft receiving a torque from an engine, an input disk connected with the input shaft, an output disk connected with an output gear disposed coaxially with the input shaft, and input and output bearings supporting the input shaft and the output gear within a transmission casing, respectively. A plurality of power rollers are disposed within a toroidal cavity formed between opposed surfaces of the input and output disks. A loading cam is disposed between the input shaft and the input disk and applies an axial force to the input and output disks corresponding to the torque. The torque is transmitted from the input shaft to the output gear via the input disk, the power rollers and the output disk. A taper-roller bearing is used for each of the input and output bearings.

SUMMARY OF THE INVENTION

In the toroidal CVT of the earlier technique described above, the taper-roller bearing used for each of the input and output bearings has an outer race contact angle of less than 45 degrees. The taper-roller bearing carries a radial load rather than a thrust load due to the outer race contact angle. It will be required to increase the size of the bearing in order to carry both of the thrust load and the radial load and obtain satisfactory rolling-fatigue life of the bearing. The dimensional increase of the bearing will cause enlargement of the entire CVT.

The input and output bearings carry both of a thrust load generated by application of the axial force by the loading cam and a radial load generated by meshing engagement of the output gear with the corresponding engaging member. The axial force of the loading cam is remarkably large, namely, not less than ten times the radial load, in order to frictionally transmit the torque between the input and output disks and the power rollers.

Figure 7:
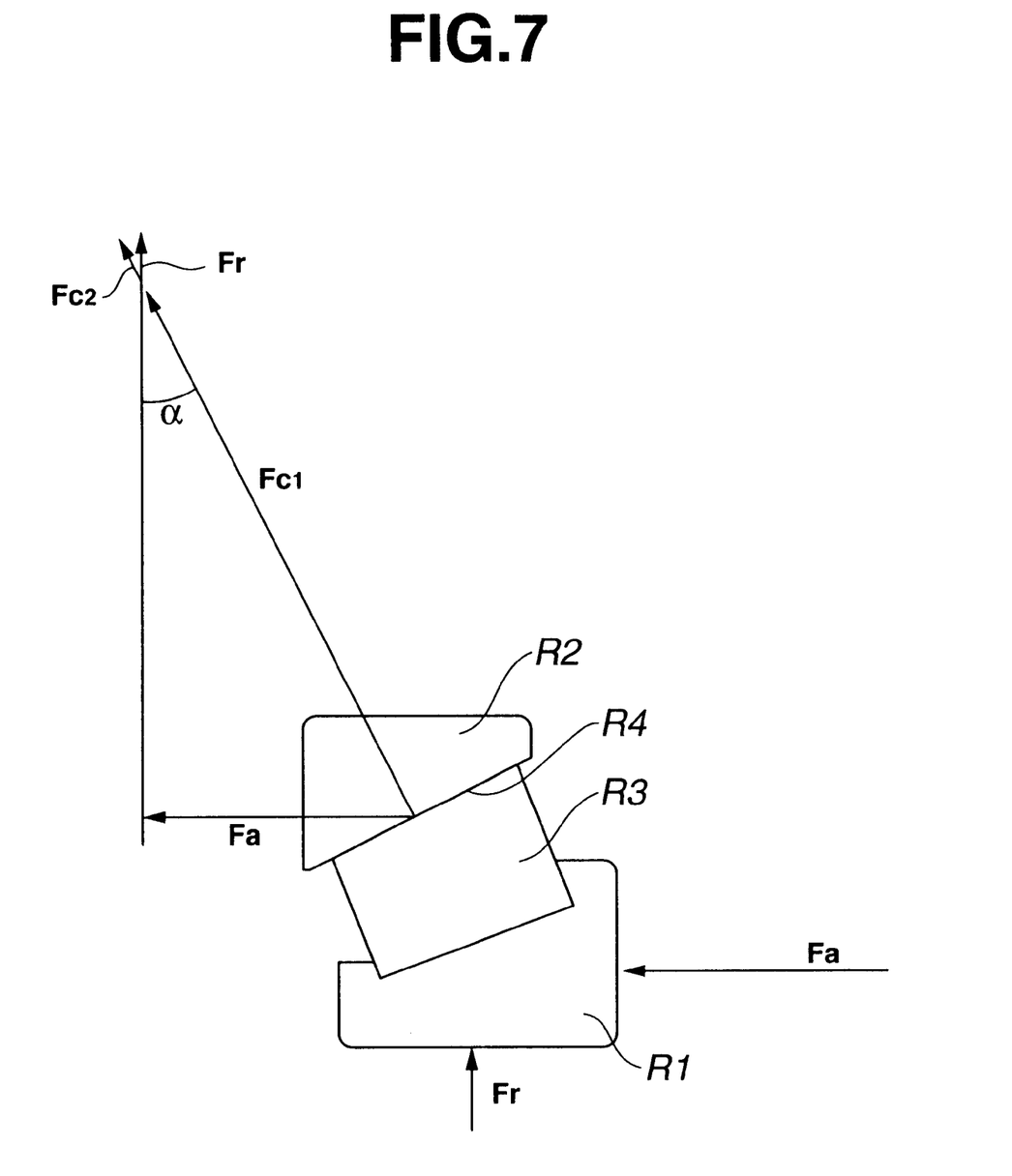
FIG. 7 is a vector diagram showing load Fc acting on a contact portion of an outer race and a roller of a taper-roller bearing of the related art.

Accordingly, it seems appropriate to use in the toroidal CVT a thrust taper-roller bearing having an outer race contact angle of not less than 45 degrees. Referring to FIG. 7, load acting on the mutual contact portion where a raceway of an outer race and a tapered roller of a taper-roller bearing are in contact with each other, is explained. In FIG. 7, R1, R2, R3 and R4 denote an inner race, an outer race, a tapered roller and a raceway of outer race R2 of the taper-roller bearing, respectively. Load Fc acing on the mutual contact portion of raceway R4 of outer race R2 and roller R3 is expressed by the following equation:

$$Fc = Fc1 + Fc2 = Fa/\sin\alpha + Fr/\cos\alpha \qquad (1)$$

where Fa is a thrust load, Fr is a radial load, and $\alpha$ is an outer race contact angle. Outer race contact angle $\alpha$ is formed by the rotation axis of the taper-roller bearing and the mutual contact between roller R3 and raceway R4 of outer race R2. Here, a relationship between thrust load Fa and radial load Fr is expressed as Fa>>Fr. If outer race contact angle $\alpha$ becomes larger, load Fc will decrease. In this case, the rolling-fatigue life of the taper-roller bearing can be improved.

However, if outer race contact angle $\alpha$ becomes larger, an increase ratio of load Fc to radial load Fr will become higher. This will cause rigidity of the taper-roller bearing in the radial direction to be lowered. Therefore, even if a small load generated by the meshing engagement of the output gear and the corresponding gear member acts on the taper-roller bearing, the inner race will be eccentrically largely displaced relative to the outer race so that the input and output disks will be placed in offset positions relative to the power rollers. This will adversely affect controllability of speed change of the CVT.

In the consideration of the characteristic of the thrust taper-roller bearing as explained above, the toroidal CVT of the earlier technique employs a radial taper-roller bearing having outer race contact angle $\alpha$ of less than 45 degrees for each of the input and output bearings. In this case, however, relatively large thrust load Fa will be amplified to produce larger load Fc. Therefore, the radial taper-roller bearing must be enlarged in size in order to provide the satisfactory rolling-fatigue life.

An object of the present invention is to provide a toroidal continuously variable transmission (CVT) which is capable of exhibiting satisfactory rolling-fatigue life of input and output bearings and maintaining high speed-change controllability by using the input and output bearings having reduced size.

According to one aspect of the present invention, there is provided a toroidal continuously variable transmission for a vehicle engine, comprising:

a casing;

an input shaft rotatably disposed within the casing, the input shaft being adapted to receive a torque from the engine;

an input disk connected with the input shaft;

an output disk cooperating with the input disk to form a toroidal cavity between opposed surfaces thereof;

a power roller rotatably disposed in the toroidal cavity;

a loading member applying a force corresponding to the torque to the input and output disks so as to make frictional contact between the power roller and the opposed surfaces of the input and output disks;

an output shaft receiving the torque via the power roller and the output disk;

an input bearing rotatably supporting the input shaft within the casing; and an output bearing rotatably supporting the output shaft within the casing, each of the input and output bearings comprising a taper-roller bearing having a rotation axis and a radial bearing arranged parallel to the taper-roller bearing with respect to the rotation axis, the taper-roller bearing comprising an inner race, an outer race and a plurality of tapered rollers contacted with the inner and outer races, the taper-roller bearing having an outer race contact angle of not less than 45 degrees between the rotation axis and the mutual contact of the outer race and the tapered rollers.

According to a further aspect of the present invention, there is provided a toroidal continuously variable transmission, comprising:

a casing;

an input shaft rotatably disposed within the casing;

an input disk coaxially connected with the input shaft;

an output disk arranged in coaxial and opposed relation to the input disk, the output disk cooperating with the input disk to form a toroidal cavity between opposed surfaces thereof;

an output shaft coaxially and rotatably connected with the output disk;

a power roller rotatably disposed within the toroidal cavity in contact with the opposed surfaces of the input and output disks;

a loading member applying a thrust force to the input and output disks;

an input bearing rotatably supporting the input shaft within the casing; and an output bearing rotatably supporting the output shaft within the casing, each of the input and output bearings comprising a thrust bearing having a rotation axis and a radial bearing arranged parallel to the thrust bearing with respect to the rotation axis, the thrust bearing comprising an inner race, an outer race on which the thrust force applied by the loading member acts, and a plurality of tapered rollers in contact with the inner and outer races, the thrust bearing having an outer race contact angle of not less than 45 degrees between the rotation axis and the mutual contact of the outer race and the tapered rollers.

DESCRIPTION OF THE PREFERRED EMBODIMENT

Figure 1:
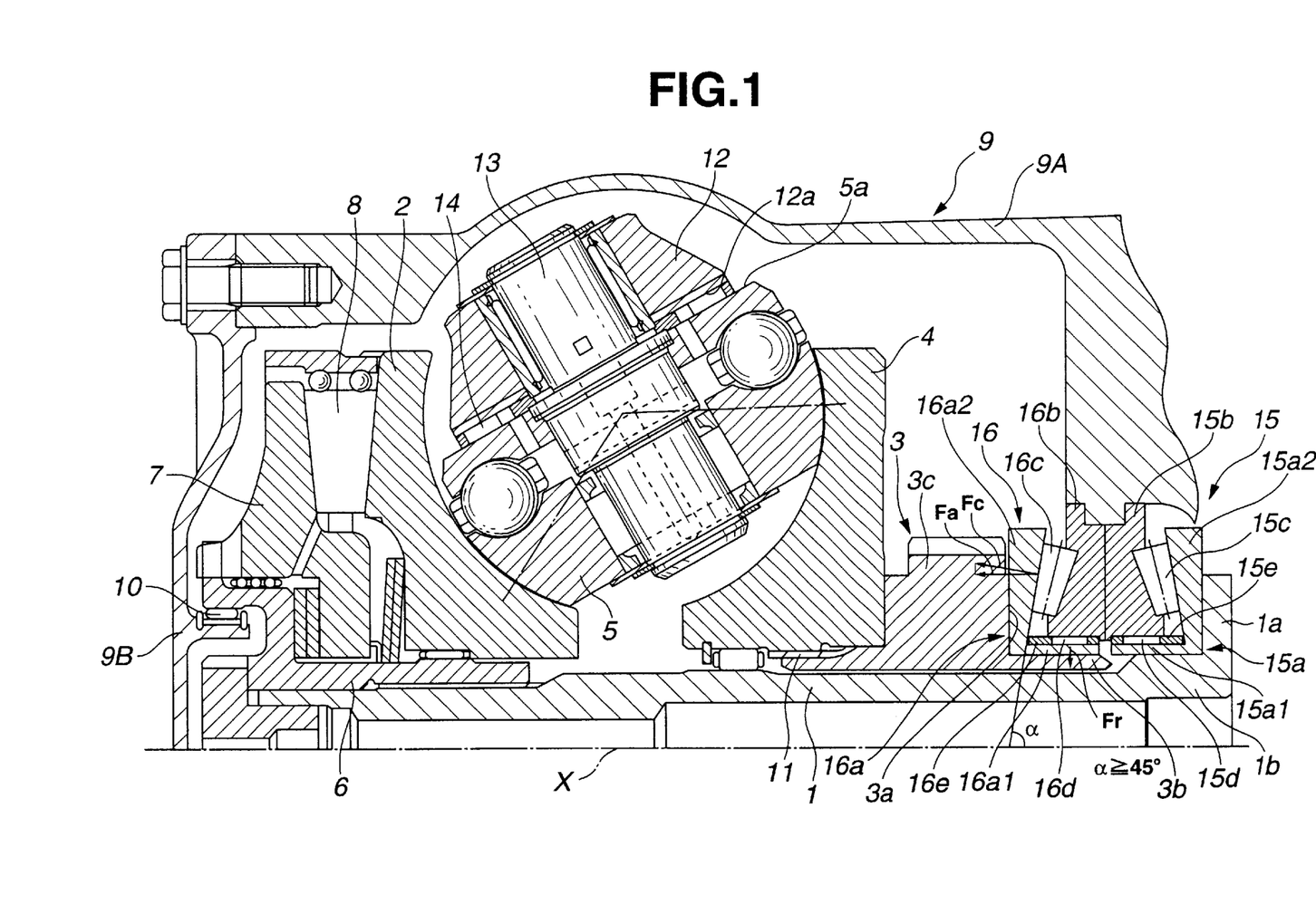
FIG. 1 is a sectional view of a toroidal continuously variable transmission (CVT) of a first embodiment, according to the present invention, taken along an axis of an input shaft.

Referring now to FIG. 1, there is shown a toroidal continuously variable transmission (CVT) of a first embodiment, according to the present invention. In FIG. 1, only an upper half of the CVT is shown for the purpose of simple illustration.

As illustrated in FIG. 1, the toroidal CVT includes transmission casing 9, input shaft 1 disposed within casing 9, input disk 2 connected to input shaft 1, output shaft 3 coaxial with input shaft 1, output disk 4 connected to output shaft 3, and power roller 5 disposed within a toroidal cavity formed by input disk 2 and output disk 4.

Input shaft 1 is supported rotatably about axis X by input bearing 15 within transmission casing 9. Input shaft 1 receives a torque from an engine (not shown) via a torque converter (not shown) and a forward-reverse switching mechanism (not shown). Input shaft 1 and input disk 2 are connected with each other through input flange 6, cam flange 7 and loading cam 8. Loading cam 8 applies to input disk 2 a force corresponding to the torque transmitted to loading cam 8, in the axial direction of input shaft 1. Input flange 6 is rotatably supported relative to end wall 9B of transmission casing 9 through needle bearing 10. Output shaft 3 formed with output gear is connected with output disk 4 at spline 11 and transmits the torque from output disk 4 to driving wheels via a torque-transmission device (not shown).

Input disk 2 and output disk 4 are arranged within casing 9 in coaxial relation to input shaft 1. Input disk 2 and output disk 4 have axially opposed surfaces forming the toroidal cavity having a generally semicircular-shaped section taken along axis X of input shaft 1. Power rollers 5, only one of which is shown in FIG. 1, are rotatably disposed within the toroidal cavity in contact with the opposed surfaces of input and output disks 2 and 4. Each power roller 5 is supported on trunnion 12 via pivot shaft 13. Power roller 5 is rotatably supported at one end of eccentric pivot shaft 13. Trunnion 12 is rotatably supported at an opposite end of pivot shaft 13. Trunnion 12 is controlled by a servo piston (not shown) such that the rotation axis is inclined. Power roller 5 is thus supported rotatably and tiltably. Needle bearing 14 is disposed between back surface 5a of power roller 5 and recess 12a of trunnion 12 to which power roller 5 is mounted. Needle bearing 14 carries a thrust force applied to power roller 5.

Input bearing 15 is disposed between flange 1a of input shaft 1 and barrel portion 9A of casing 9. Input shaft 1 is rotatably supported by input bearing 15 within casing 9. Output bearing 16 is disposed between shaft portion 3b of output shaft 3 and barrel portion 9A of casing 9. Output shaft 3 is rotatably supported by output bearing 16 within casing 9.

Input bearing 15 includes outer race 15a fixed to shaft portion 1b and flange 1a of input shaft 1, inner race 15b fixed to barrel portion 9A of casing 9 in spaced relation to outer race 15a, and tapered rollers 15c, needles 15d and retainer 15e which are disposed between outer race 15a and inner race 15b. Outer race 15a includes annular portion 15a1 and radially extending flange portion 15a2 joined with annular portion 15a1. Inner race 15b has a generally annular shape.

Input bearing 15 is constituted by a pair of bearings composed of a taper-roller bearing substantially acting as a thrust bearing, and a radial bearing arranged parallel to the taper-roller bearing with respect to rotation axis X of the taper-roller bearing. The pair of bearings use outer race 15a and inner race 15b of input bearing 15 in common.

The taper-roller bearing of input bearing 15 is formed by flange portion 15a2 of outer race 15a, an axial end portion of inner race 15b which is axially opposed and spaced from flange portion 15a2, and tapered rollers 15c interposed between flange portion 15a2 and the axial end portion of inner race 15b. Flange portion 15a2 has a raceway surface contacted with tapered rollers 15c of the taper-roller bearing. The angle formed by rotation axis X of the taper-roller bearing and the mutual contact between the raceway surface of flange portion 15a2 and tapered rollers 15c is regarded as outer race contact angle α explained above by referring to FIG. 7. The taper-roller bearing has the outer race contact angle of not less than 45 degrees.

The radial bearing of input bearing 15 is formed by annular portion 15a1 of outer race 15a, an inside portion of inner race 15b which is radially opposed and spaced from annular portion 15a1, and needles 15d and retainer 15e which are interposed between annular portion 15a1 and the inside portion of inner race 15b.

Similar to input bearing 15, output bearing 16 is constituted by a pair of bearings composed of a taper-roller bearing substantially acting as a thrust bearing, and a radial bearing arranged parallel to the taper-roller bearing. The pair of bearings use outer race 16a and inner race 16b of output bearing 16 in common.

Output bearing 16 includes outer race 16a fixed to axial end face 3a of output gear portion 3c of output shaft 3, inner race 16b fixed to barrel portion 9A of casing 9, and tapered rollers 16c, needles 16d and retainer 16e which are disposed between outer race 16a and inner race 16b. Outer race 16a includes annular portion 16a1 and radially extending flange portion 16a2 joined with annular portion 16a1. Inner race 16b has a generally annular shape.

The taper-roller bearing of output bearing 16 is formed by flange portion 16a2 of outer race 16a, an axial end portion of inner race 16b which is axially opposed and spaced from flange portion 16a2, and tapered rollers 16c interposed between flange portion 16a2 and the axial end portion of inner race 16b. Flange portion 16a2 has a raceway surface contacted with tapered rollers 16c of the taper-roller bearing. The taper-roller bearing of output bearing 16 has outer race contact angle α formed by rotation axis X thereof and the mutual contact between the raceway surface of flange portion 16a2 and tapered rollers 16c. Thus, the outer race contact angles of the taper-roller bearings of input and output bearings 15 and 16 are defined in the same manner. For the purpose of simple illustration, only the outer race contact angle of the taper-roller bearing of output bearing 16 is indicated at α in FIG. 1. Outer race contact angle α of the taper-roller bearing of output bearing 16 is not less than 45 degrees, similar to that of the taper-roller bearing of input bearing 15.

The radial bearing of output bearing 16 is formed by annular portion 16a1 of outer race 16a, an inside portion of inner race 16b which is radially opposed and spaced from annular portion 16a1, and needles 16d and retainer 16e which are interposed between annular portion 16a1 and the inside portion of inner race 16b.

Upon changing the speed in the toroidal CVT, a rotation axis of each power roller 5 is offset relative to the common rotation axis of input and output disks 2 and 4 by tilting trunnion 12. Owing to the offset, a side-slip force occurs at the mutual contact between power rollers 5 and input and output disks 2 and 4. As the mutual contact between power rollers 5 and input and output disks 2 and 4 is displaced, the effective radiuses of input and output disks 2 and 4 vary so that the speed ratio continuously varies.

Input bearing 15 and output bearing 16 rotatably supporting input shaft 1 and output shaft 3 within casing 9, respectively, carry both of thrust load Fa applied to input disk 2 and output disk 4 by loading cam 8, and radial load Fr caused by meshing engagement of output gear portion 3c of output shaft 3 with the corresponding gear member (not shown). Thrust load Fa is carried by the taper-roller bearing of each of input and output bearings 15 and 16 which has the outer race contact angle of not less than 45 degrees between rotation axis X thereof and the mutual contact of tapered rollers 15c and 16c and flange portion 15a2 and 16a2 acting as the outer race of the taper-roller bearing. Radial load Fr is carried by the radial bearing of each of input and output bearings 15 and 16 which is arranged in parallel relation to the taper-roller bearing.

The force to be generated by loading cam 8 is significantly largely set in order to frictionally transmit power between input and output disks 2 and 4 and power rollers 5. Therefore, thrust load Fa caused by the force of loading cam 8 is considerably larger than radial load Fr caused by the meshing engagement of output gear portion 3c of output shaft 3 with the corresponding gear member. In each of input bearing 15 and output bearing 16, the loads acting thereon are shared by the taper-roller bearing carrying thrust load Fa and the radial bearing carrying radial load Fr. As explained above, if the outer race contact angle of the taper-roller bearing becomes large, the increase ratio of load Fc acting on the mutual contact of the tapered rollers and the outer race, to thrust load Fa can be lowered. Therefore, the taper-roller bearing having the outer race contact angle of not less than 45 degrees can reduce the maximum of load Fc.

Further, the taper-roller bearing having the outer race contact angle of not less than 45 degrees can be decreased in the axial length as compared with the taper-roller bearing of the earlier technique which has the outer race contact angle of less than 45 degrees. The taper-roller bearing having the outer race contact angle of not less than 45 degrees can reduce the maximum of load Fc in spite of the decreased axial length. Input and output bearings 15 and 16 can serve for providing satisfactory rolling-fatigue lives of the taper-roller bearings.

Further, even if the increase ratio of load Fc acting on the mutual contact between tapered rollers 15c and 16c and outer race 15a2 and 16a2, to radial load Fr becomes high due to the outer race contact angle of not less than 45 degrees, radial load Fr can be carried by the radial bearing of each of input and output bearings 15 and 16 so that the rigidity of input and output bearings 15 and 16 in the radial direction can be prevented from being lowered. Therefore, even when radial load Fr caused by the meshing engagement at output gear portion 3c of output shaft 3 acts on input and output bearings 15 and 16, relative eccentric displacement of outer races 15a and 16a and inner races 15b and 16b can be prevented. Input and output disks 2 and 4 can, therefore, be restrained from being displaced relative to power rollers 5 so that good controllability of speed change of the CVT can be maintained.

In addition, the taper-roller bearing and the radial bearing of each of input and output bearings 15 and 16 are arranged in overlapping relation to each other in the axial direction, as shown in FIG. 1. With the overlapping arrangement, the axial length of the taper-roller bearing can be reduced. Input and output bearings 15 and 16 can be reduced in size as compared with the input and output bearings of the earlier technique.

As be apparent from the above description, the toroidal CVT of the invention includes input and output bearings 15 and 16 each constituted by the pair of bearings composed of the taper-roller bearing having outer race contact angle $\alpha$ of not less than 45 degrees and the radial bearing arranged in parallel to the taper-roller bearing. The taper-roller bearing substantially acts as the thrust bearing. The toroidal CVT of the invention can exhibit the satisfactory rolling-fatigue lives of input and output bearings 15 and 16 and maintain the good speed-change controllability by using input and output bearings 15 and 16 having the reduced size.

Figure 2:
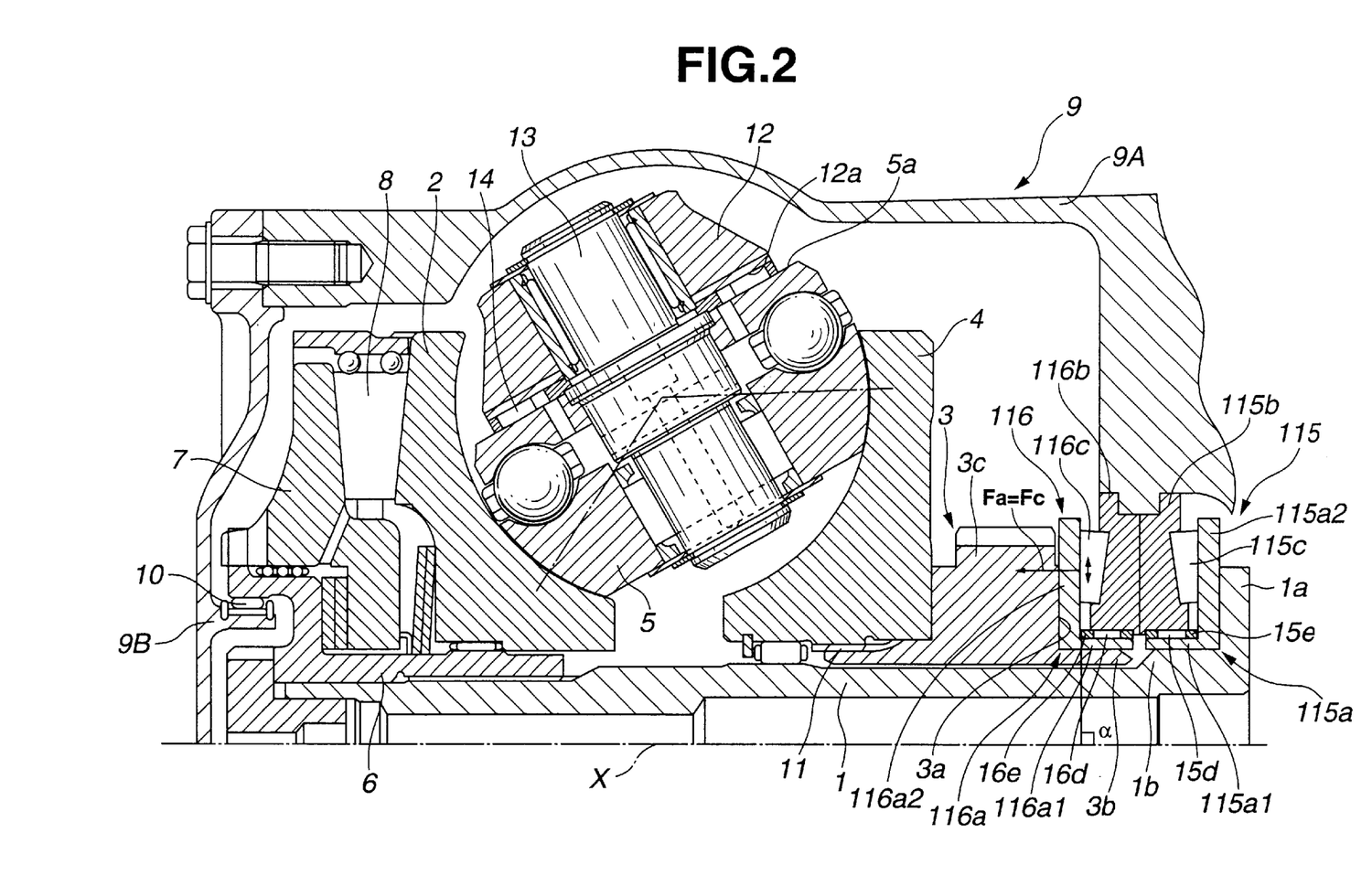
FIG. 2 is a view similar to FIG. 1, but showing the toroidal CVT of a second embodiment, according to the present invention.

Referring to FIG. 2, the toroidal CVT of a second embodiment is explained hereinafter. The second embodiment differs from the first embodiment in that outer race contact angle $\alpha$ of the taper-roller bearing of each of input bearing 115 and output bearing 116 is 90 degrees. Like reference numerals denote like parts and therefore detailed explanations therefor are omitted.

As illustrated in FIG. 2, input bearing 115 includes outer and inner races 115a and 115b and tapered rollers 115c therebetween. Output bearing 116 includes outer and inner races 116a and 116b and tapered rollers 116c therebetween. The taper-roller bearing of each of input and output bearings 115 and 116 has outer race contact angle $\alpha$ of 90 degrees. In this case, the increase ratio of load Fc acting on the mutual contact between tapered rollers 115c and 116c and flange portions 115a2 and 116a2 of outer races 115a and 116a, to thrust load Fa is 1:1. Namely, thrust load Fa is equal to load Fc. Tapered rollers 115c and 116c are permitted to make a radial stroke along flange portions 115a2 and 116a2 in contact therewith.

In the toroidal CVT of the second embodiment, the axial length of the taper-roller bearing of each of input and output bearings 115 and 116 can be reduced to the minimum. Further, even if the taper-roller bearing and the radial bearing of both or either one of input and output bearings 115 and 116 are in eccentric relation to each other due to machining error occurring in outer and inner races 115a and 115b and/or 116a and 116b, flange portions 115a2 and 116a2 of outer races 115a and 116a can be adversely affected by radial load Fr acting thereon. This can serve for reducing load Fc acting on the mutual contact between flange portions 115a2 and 116a2 and tapered rollers 115c and 116c. Also, the second embodiment can exhibit the same effects as the above-described effects of the first embodiment.

Figure 3:
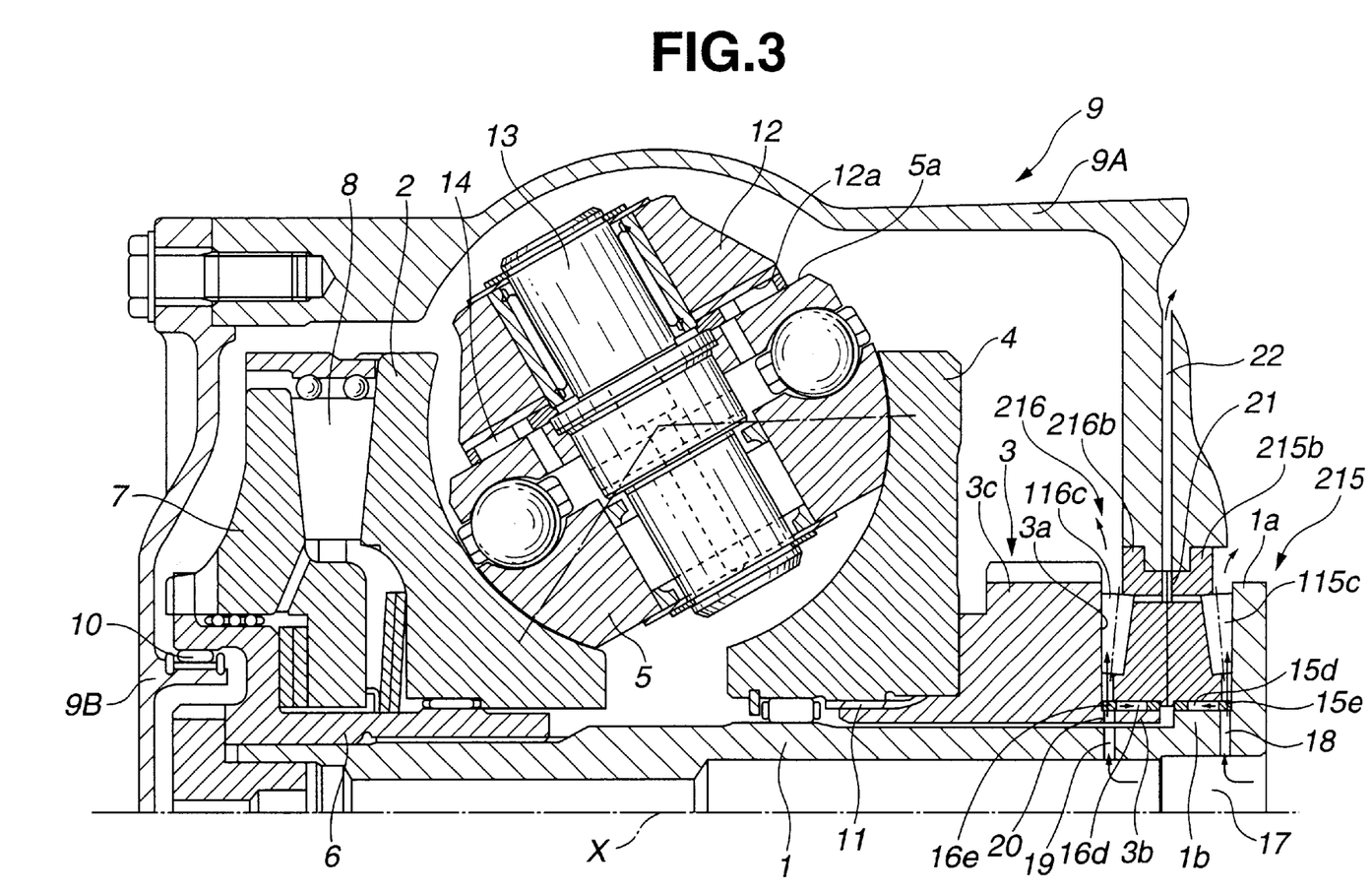
FIG. 3 is a view similar to FIG. 2, but showing the toroidal CVT of a third embodiment, according to the present invention.

Referring to FIG. 3, there is shown the toroidal CVT of a third embodiment, which differs from the second embodiment in that the outer races of input and output bearings 215 and 216 are integrally formed with input shaft 1 and output shaft 3, respectively, and in that lubricating oil supply passages 18, 19 and 20 and lubricating oil drain passages 21 and 22 are provided.

As illustrated in FIG. 3, flange 1a of input shaft 1 is used as the outer race of the taper-roller bearing of input bearing 215. Shaft portion 1b located near flange portion 1a is used as the inner race of the radial bearing of input bearing 215. The axial end face 3a side of output gear portion 3c of output shaft 3 is used as the outer race of the taper-roller bearing of output bearing 216. Shaft portion 3b of output shaft 3 is used as the inner race of the radial bearing of output bearing 216.

Thus, the third embodiment dispenses with separate parts to be used for the outer races of input and output bearings 215 and 216. This can reduce the number of parts of input and output bearings 215 and 216 and the dimension of input and output bearings 215 and 216.

As illustrated in FIG. 3, lubricating oil supply passage 18 radially extends through shaft portion 1b of input shaft 1 and communicates with axial oil passage 17 of input shaft 1. Lubricating oil supply passage 18 feeds a lubricating oil to both of the taper-roller bearing and the radial bearing of input bearing 215. Lubricating oil supply passages 19 and 20 radially extend through shaft portion 1b of input shaft 1 and shaft portion 3b of output shaft 3, respectively. Lubricating oil supply passages 19 and 20 are in substantially radial alignment with each other and communicated with axial oil passage 17 to feed the lubricating oil to both of the taper-roller bearing and the radial bearing of output bearing 216. Lubricating oil drain passage 21 extends through each of inner races 215b and 216b of input and output bearings 215 and 216 and communicates with lubricating oil drain passage 22 formed in transmission casing 9. Lubricating oil drain passage 21 permits the lubricating oil, that enters into input and output bearings 215 and 216 via lubricating oil supply passages 18, 19 and 20 and flows along tapered rollers 115c and 116c, to be discharged from near the jaws of tapered rollers 115c and 116c into lubricating oil drain passage 22. Lubricating oil drain passage 22 receives the lubricating oil discharged from input and output bearings 215 and 216.

Lubricating oil supply passages 18, 19 and 20 for lubricating both of the taper-roller bearing and the radial bearing of each of input and output bearings 215 and 216 are thus disposed on the inner race side of the respective radial bearings of input and output bearings 215 and 216. With the arrangement, it is not required to form separate oil passages for individually supplying the lubricating oil to the taper-roller bearing and the radial bearing. This can reduce the number of lubricating oil passages in input and output bearings, serving for facilitating a simple oil-passage structure. The third embodiment also can exhibit the same effects as the above-described effects of the first and second embodiments.

Figure 4:
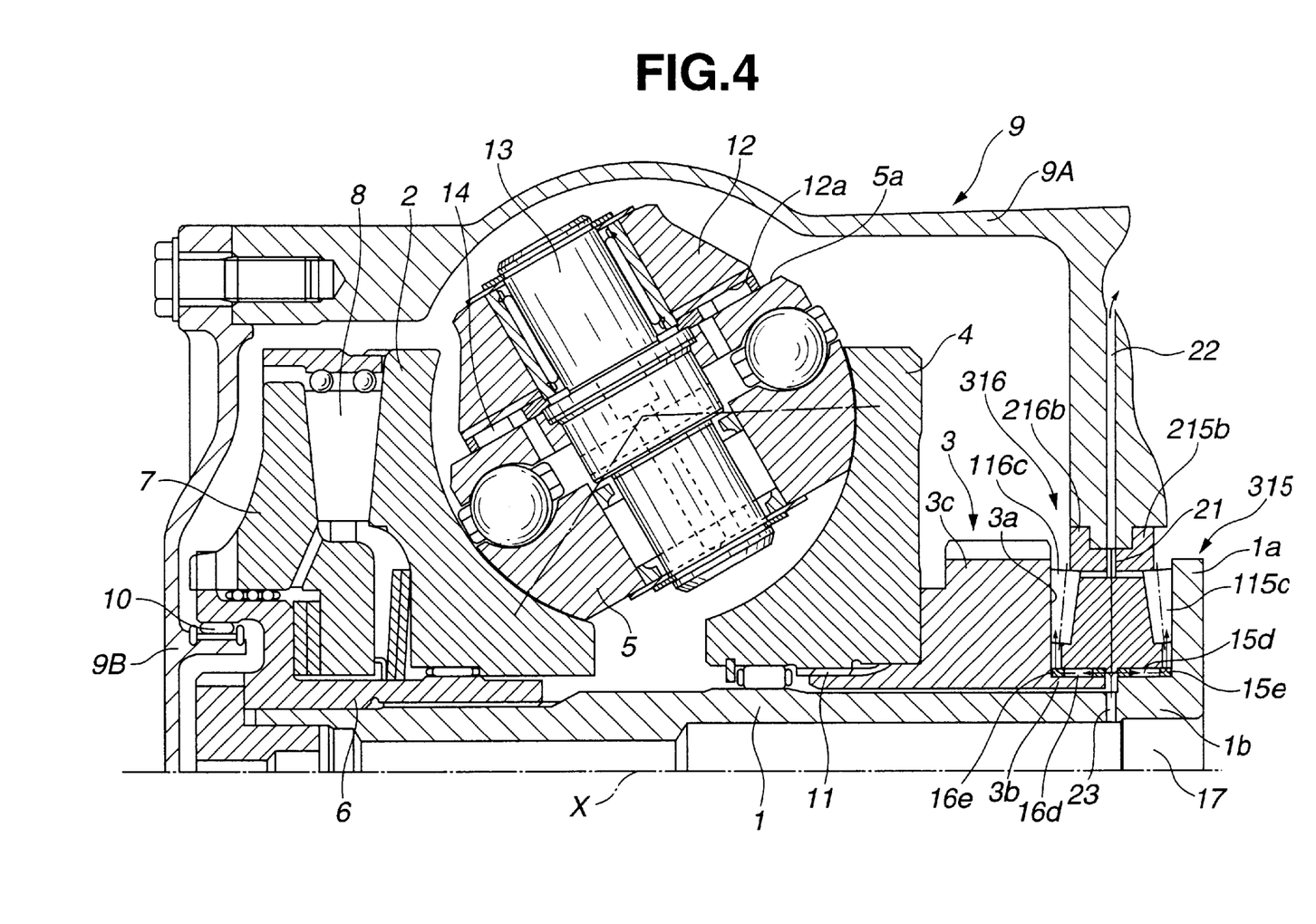
FIG. 4 is a view similar to FIG. 3, but showing the toroidal CVT of a fourth embodiment, according to the present invention.

Referring to FIG. 4, there is shown the toroidal CVT of a fourth embodiment, which differs from the third embodiment in that common lubricating oil supply passage 23 is formed instead of lubricating oil supply passages 18, 19 and 20.

As illustrated in FIG. 4, common lubricating oil passage 23 radially extends through shaft portion 1b of input shaft 1 toward the mutually mating portions of inner races 215b and 216b of input and output bearings 315 and 316, in which opposed axial end surfaces of inner races 215b and 216b mate with each other. Common lubricating oil passage 23 is communicated with axial oil passage 17 of input shaft 1 and supplies the lubricating oil to both of the taper-roller bearing and the radial bearing of each of input and output bearings 315 and 316.

The fourth embodiment can further reduce the number of lubricating oil passages in input and output bearings, serving for facilitating a simpler oil-passage structure than that of the third embodiment.

Figure 5:
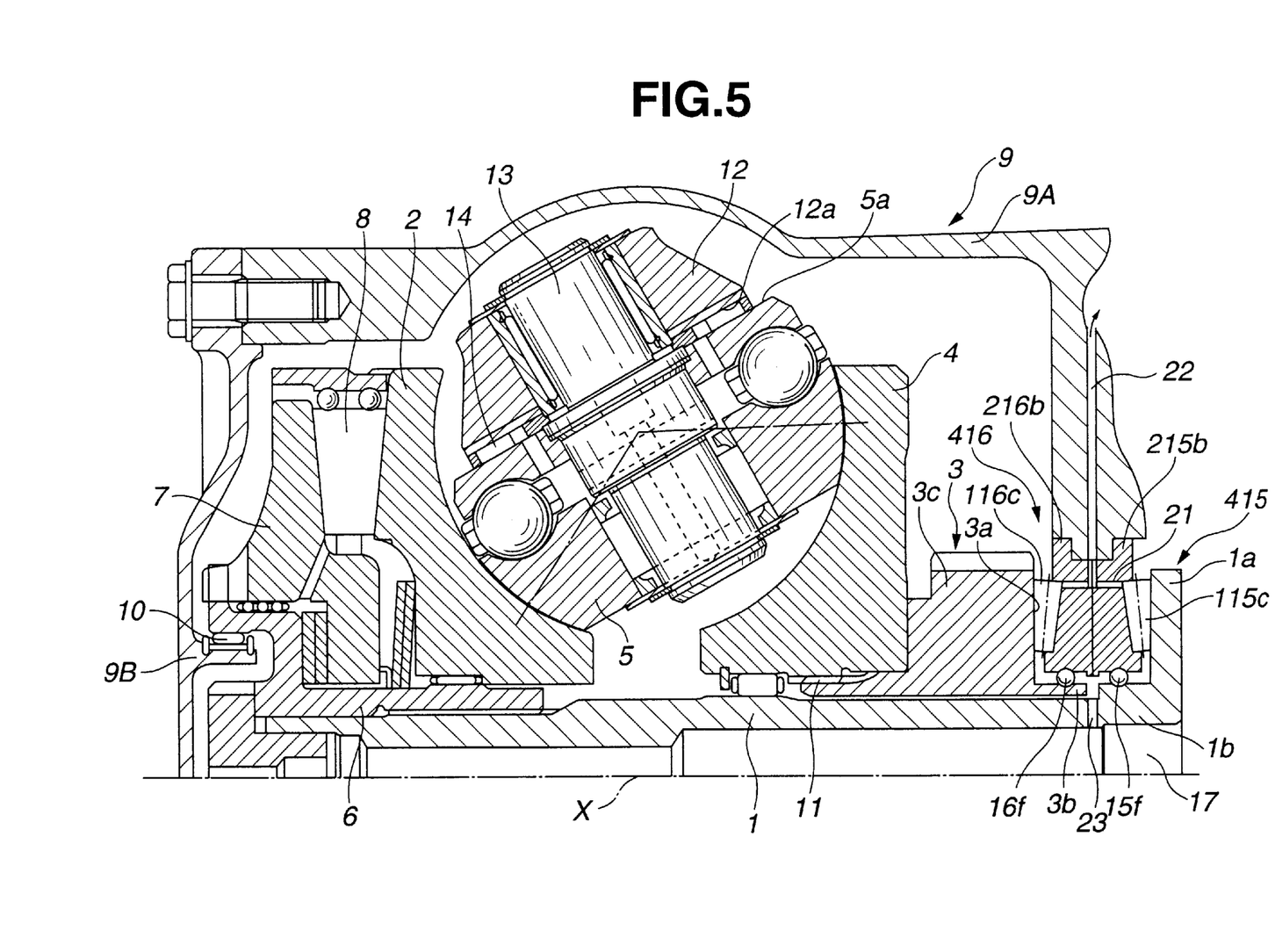
FIG. 5 is a view similar to FIG. 4, but showing the toroidal CVT of a fifth embodiment, according to the present invention.

Referring to FIG. 5, there is shown the toroidal CVT of a fifth embodiment, which differs from the fourth embodiment in that rolling elements of the radial bearings of input and output bearings 415 and 416 are in the form of a plurality of balls 15f and 16f, respectively.

Balls 15f, one of which is shown in FIG. 5, are interposed between inner race 215b and shaft portion 1b of input shaft 1. Inner race 215b acts as the outer race of the radial bearing of input bearing 415 and shaft portion 1b acts as the inner race of the radial bearing thereof. Balls 16f, one of which is shown in FIG. 5, are interposed between inner race 216b and shaft portion 3b of output shaft 3. Inner race 216b acts as the outer race of the radial bearing of output bearing 416 and shaft portion 3b acts as the inner race of the radial bearing thereof. The radial bearing of each of input and output bearings 415 and 416 has a contact angle between balls 15f and raceways of shaft portion 1b and inner race 215b and between balls 16f and raceways of shaft portion 3b and inner race 216b.

By using the radial bearing having the contact angle between balls 15f and 16f and the raceways of shaft portions 1b and 3b and inner races 215b and 216b, a pre-load can be applied to the radial bearing to thereby prevent the occurrence of clearance between balls 15f and 16f and shaft portions 1b and 3b and inner races 215b and 216b and the relative radial displacement thereof. The fifth embodiment also can exhibit the same effects as the above-described effects of the first and second embodiments.

Figure 6:
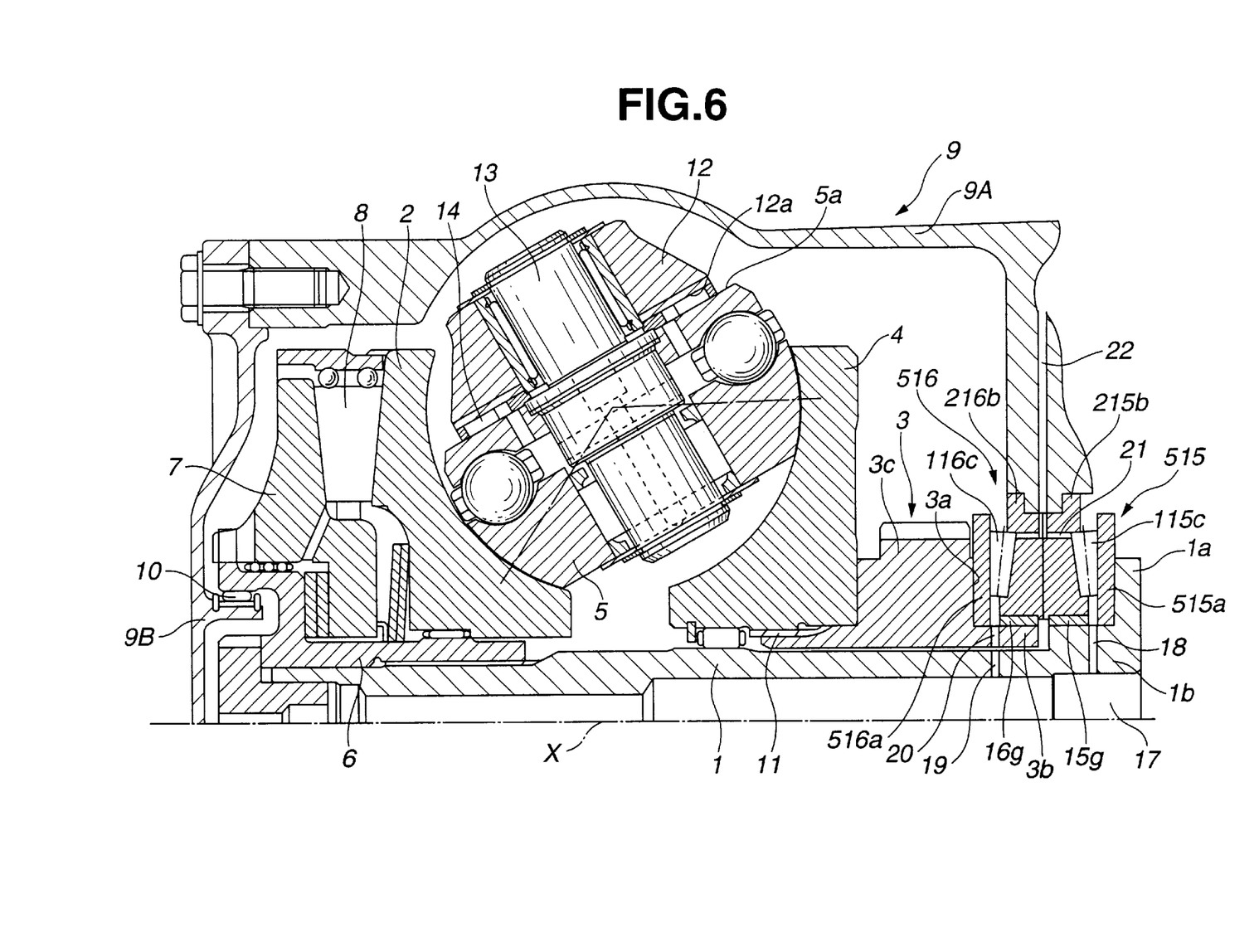
FIG. 6 is a view similar to FIG. 3, but showing the toroidal CVT of a sixth embodiment, according to the present invention.

Referring to FIG. 6, there is shown the toroidal CVT of a sixth embodiment. The sixth embodiment differs from the third embodiment in that sliding bearings 15g and 16g are used for the radial bearings of input and output bearings 515 and 516.

As illustrated in FIG. 6, sliding bearing 15g is disposed between shaft portion 1b of input shaft 1 and inner race 215b of input bearing 515, and sliding bearing 16g is disposed between shaft portion 3b of output shaft 3 and inner race 216b of output bearing 516. The taper-roller bearing of input bearing 515 includes ring 515a contacted with tapered rollers 115c and supported by flange 1a of input shaft 1. The taper-roller bearing of output bearing 516 includes ring 516a contacted with tapered rollers 116c and supported by axial end face 3a of output gear portion 3c.

Generally, sliding bearings are inexpensive as compared with rolling bearings. Accordingly, the sixth embodiment utilizing sliding bearings 15g and 16g can contribute to reduction of the production cost.

This application is based on Japanese Patent Application No. 2000-139569, filed on May 12, 2000, the entire contents of which, inclusive of the specification, claims and drawings, are hereby incorporated by reference herein.

Although the invention has been described above by reference to the certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A toroidal continuously variable transmission for a vehicle engine, comprising:
   a casing;
   an input shaft rotatably disposed within the casing, the input shaft being adapted to receive a torque from the engine;
   an input disk connected with the input shaft;
   an output disk cooperating with the input disk to form a toroidal cavity between opposed surfaces thereof;
   a power roller rotatably disposed in the toroidal cavity;
   a loading member applying a force corresponding to the torque to the input and output disks so as to make frictional contact between the power roller and the opposed surfaces of the input and output disks;
   an output shaft receiving the torque via the power roller and the output disk;
   an input bearing rotatably supporting the input shaft within the casing; and
   an output bearing rotatably supporting the output shaft within the casing,
   each of the input and output bearings comprising a taper-roller bearing having a rotation axis and a radial bearing arranged parallel to the taper-roller bearing with respect to the rotation axis, each of the taper-roller bearings comprising an inner race, an outer race and a plurality of tapered rollers contacted with the inner and outer races, the taper-roller bearing having an outer race contact angle of not less than 45 degrees between the rotation axis and the mutual contact of the outer race and the tapered rollers.

2. The toroidal continuously variable transmission as claimed in claim 1, wherein the outer race contact angle is 90 degrees.

3. The toroidal continuously variable transmission as claimed in claim 1, wherein each of the radial bearings comprises inner and outer races and a plurality of rolling elements therebetween, the input shaft comprising a first shaft portion and a flange connected with the first shaft portion, the output shaft comprising a second shaft portion and a radially extending portion connected with the second shaft portion, the outer race of the taper-roller bearing of the input bearing being integrally formed with the flange of the input shaft, the inner race of the radial bearing of the input bearing being integrally formed with the first shaft portion of the input shaft, the outer race of the taper-roller bearing of the output bearing being integrally formed with the radially extending portion of the output shaft, the inner race of the radial bearing of the output bearing being integrally formed with the second shaft portion of the output shaft.

4. The toroidal continuously variable transmission as claimed in claim 1, wherein the input shaft is formed with a lubricating oil passage, the radial bearing comprising inner and outer races and a plurality of rolling elements therebetween, the inner race of the radial bearing of the input bearing being formed with an oil supply passage communicated with the lubricating oil passage of the input shaft to supply a lubricating oil to the taper-roller bearing and the radial bearing of each of the input and output bearings.

5. The toroidal continuously variable transmission as claimed in claim 4, wherein the oil lubricating passage of the input shaft comprises separate oil supply passages individually supplying the lubricating oil to the taper-roller bearing and the radial bearing of each of the input and output bearings.

6. The toroidal continuously variable transmission as claimed in claim 5, wherein the inner race of the radial bearing of the output bearing is formed with a second oil supply passage supplying the lubricating oil to both of the taper-roller bearing and the radial bearing of the output bearing, the second oil supply passage being communicated with one of the separate oil supply passages.

7. The toroidal continuously variable transmission as claimed in claim 1, wherein the radial bearing comprises an inner race, an outer race and a plurality of needles between the inner and outer races.

8. The toroidal continuously variable transmission as claimed in claim 1, wherein the radial bearing comprises an inner race, an outer race and a plurality of rolling elements contacted with inner and outer races, the radial bearing having a contact angle between the inner and outer races and the rolling elements.

9. The toroidal continuously variable transmission as claimed in claim 1, wherein the radial bearing comprises a sliding bearing.

10. The toroidal continuously variable transmission as claimed in claim 1, wherein the outer race of each of the taper-roller bearings is formed with an oil drain passage for discharging the lubricating oil from each of the input and output bearings.

11. The toroidal continuously variable transmission as claimed in claim 10, wherein the casing is formed with a second oil drain passage communicated with the first oil drain passage of the outer race of the taper-roller bearing.

12. The toroidal continuously variable transmission as claimed in claim 1, wherein the radial bearing comprises inner and outer races and a plurality of rolling elements therebetween, the inner race of each of the taper-roller bearings being integrally formed with the outer race of the radical bearing.

13. A toroidal continuously variable transmission, comprising:

a casing;

an input shaft rotatably disposed within the casing;

an input disk coaxially connected with the input shaft;

an output disk arranged in coaxial and opposed relation to the input disk, the output disk cooperating with the input disk to form a toroidal cavity between opposed surfaces thereof;

an output shaft coaxially and rotatably connected with the output disk;

a power roller rotatably disposed within the toroidal cavity in contact with the opposed surfaces of the input and output disks;

a loading member applying a thrust force to the input and output disks;

an input bearing rotatably supporting the input shaft within the casing; and an output bearing rotatably supporting the output shaft within the casing, each of the input and output bearings comprising a thrust bearing having a rotation axis and a radial bearing arranged parallel to the thrust bearing with respect to the rotation axis, each of the thrust bearings comprising an inner race, an outer race on which the thrust force applied by the loading member acts, and a plurality of tapered rollers in contact with the inner and outer races, each of the thrust bearings having an outer race contact angle of not less than 45 degrees between the rotation axis and the mutual contact of the outer race and the tapered rollers.

14. The toroidal continuously variable transmission as claimed in claim 13, wherein the outer race contact angle is 90 degrees.

15. The toroidal continuously variable transmission as claimed in claim 13, wherein the radial bearing comprises inner and outer races and a plurality of rolling elements therebetween, the input shaft comprising a first shaft portion and a flange connected with the first shaft portion, the output shaft comprising a second shaft portion and a radially extending portion connected with the second shaft portion, the outer race of the thrust bearing of the input bearing being integrally formed with the flange of the input shaft, the inner race of the radial bearing of the input bearing being integrally formed with the first shaft portion of the input shaft, the outer race of the thrust bearing of the output bearing being integrally formed with the radially extending portion of the output shaft, the inner race of the radial bearing of the output bearing being integrally formed with the second shaft portion of the output shaft.

16. The toroidal continuously variable transmission as claimed in claim 13, wherein the input shaft is formed with a lubricating oil passage, the radial bearing comprising inner and outer races and a plurality of rolling elements therebetween, the inner race of the radial bearing of the input bearing being formed with an oil supply passage communicated with the lubricating oil passage of the input shaft to supply a lubricating oil to the thrust bearing and the radial bearing of each of the input and output bearings.

17. The toroidal continuously variable transmission as claimed in claim 16, wherein the oil lubricating passage of the input shaft comprises separate oil supply passages individually supplying the lubricating oil to the thrust bearing and the radial bearing of each of the input and output bearings.

18. The toroidal continuously variable transmission as claimed in claim 17, wherein the inner race of the radial bearing of the output bearing is formed with a second oil supply passage supplying the lubricating oil to both of the thrust bearing and the radial bearing of the output bearing, the second oil supply passage being communicated with one of the separate oil supply passages.

19. The toroidal continuously variable transmission as claimed in claim 13, wherein the radial bearing comprises an inner race, an outer race and a plurality of rolling elements contacted with inner and outer races, the radial bearing having a contact angle between the inner and outer races and the rolling elements.

20. The toroidal continuously variable transmission as claimed in claim 13, wherein the radial bearing comprises a sliding bearing.

21. The toroidal continuously variable transmission as claimed in claim 13, wherein the radial bearing comprises inner and outer races and a plurality of rolling elements therebetween, the inner race of the thrust bearing being integrally formed with the outer race of the radial bearing.

* * * * *